Patented Sept. 6, 1938

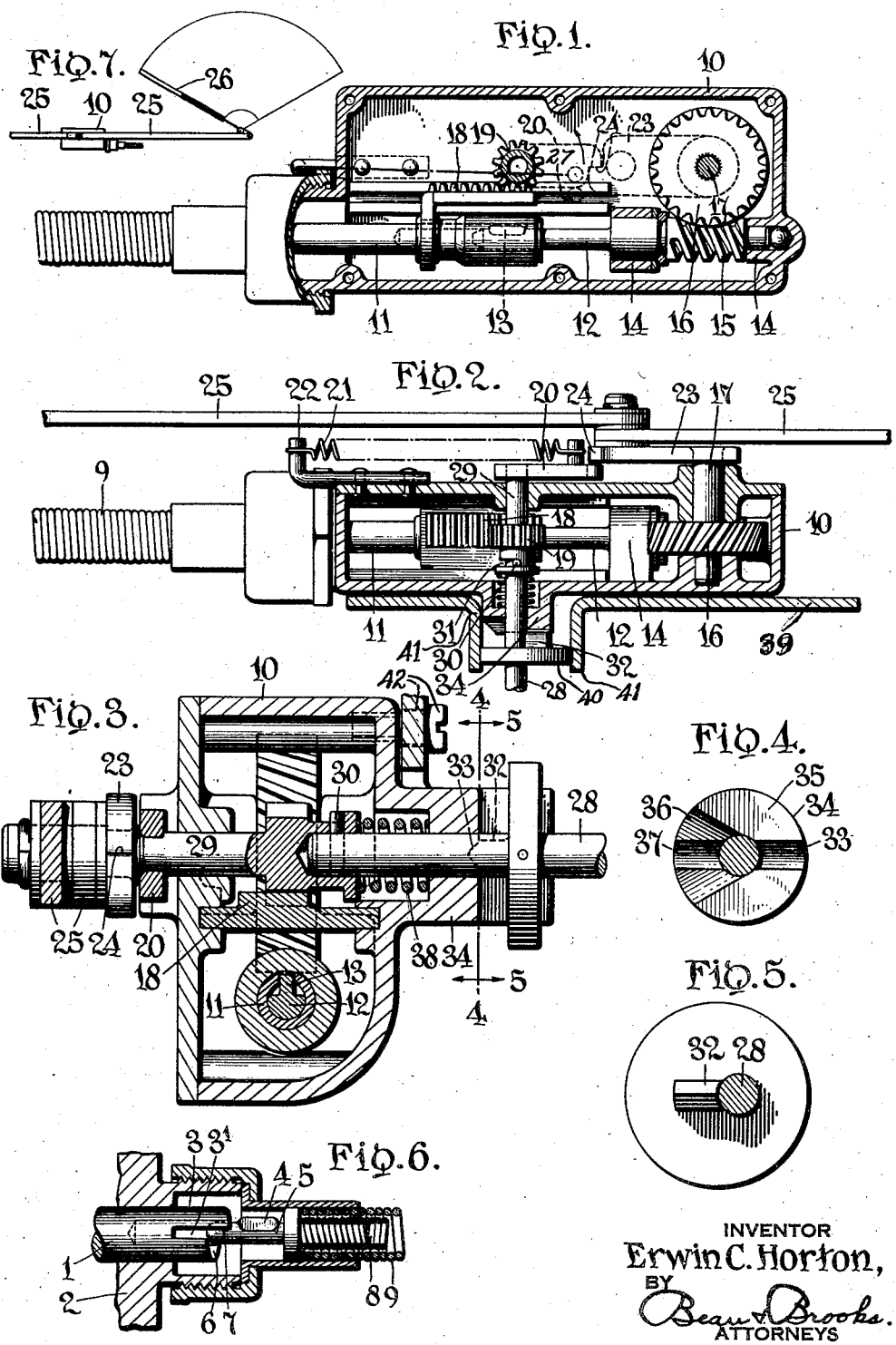

2,129,620

UNITED STATES PATENT OFFICE 2,129,620

WINDSHIELD CLEANER

Erwin C. Horton, Hamburg, N. Y., assignor to Trico Products Corporation, Buffalo, N. Y.

Application January 21, 1935, Serial No. 2,830

7 Claims. (Cl. 15—255)

This invention relates to cleaners for the windshields or windows of motor vehicles and has particular reference to the parking of the wiper element out of the field of vision when the cleaner mechanism is at rest.

Windshield cleaners have heretofore been designed for being driven from the motor vehicle power plant, the hubs of the front wheels, or some other remotely disposed source of power, necessitating the use of a power transmission and a motion translating means for properly imparting to the wiper the required movement and motion for the accomplishment of the desired result. In stopping or arresting the cleaner mechanism much annoyance has been experienced by the wiper coming to rest in a position directly across the line of vision, or failing to arrive at, or even overriding, the most desired point of arrestment (to one side of the field of normal operation, or at the end of a wiper stroke). Consequently, the motorist will turn the cleaner on and off one or more times to arrest the wiper away from his line of vision and during these manipulations his attention will be distracted from his safe control of the vehicle.

The present invention has for its object to provide a cleaner mechanism by which the wiper may be parked automatically in an efficient and practical manner. The invention more particularly has for its aim to provide a parking mechanism which will be made to function automatically by the wiper drive, but independently thereof, so as to arrest the wiper to one side of the field of vision and preferably beyond the normal path of wiper movement.

In the drawing:

Fig. 1 is an upright sectional view lengthwise through the head casing and depicting the transmission and parking mechanism, in part;

Fig. 2 is a horizontal section through the casing and more clearly illustrating the transmission and parking mechanism;

Fig. 3 is a transverse section therethrough clarifying the showing of several parts;

Figs. 4 and 5 are detailed sectional views looking in opposite directions about on the plane of lines 4—4 and 5—5 of Fig. 3;

Fig. 6 is detailed sectional view through the clutch connection with the source of power, and Fig. 7 is a diagrammatic view of a practical installation.

Referring more particularly to the drawing, the numeral 1 designates the drive shaft or source of power, which may be engine cam shaft, a separate motor shaft, or some other drive shaft. This shaft has suitable support in a bearing 2 and is illustrated as having a connector part 3 in the form of the hollow end slotted at 3' to receive the key or spline 4 of the companion and cooperable connector part 5 of the driven shaft. The connector part 5 is slidably supported in the connector part 3 on the drive shaft and when urged inwardly its key 4 will enter the slot or way 3' to interlock the two shafts for rotation in unison. To facilitate this introduction of the key, or the operative engagement of the clutch parts, the end wall of the drive shaft is provided with a cam surface 6 leading downwardly to a shoulder 7 which is alined with a wall of the slot 3'. Thus, when the key engages the cam surface, as under a resilient urge, it will ride downwardly and become engaged by the shoulder which alines it with the slot for movement thereinto whereby a secure interlock between the shafts is effected. The driven shaft has a flexible part 8 protected by a like flexible armor 9 and leading up to the head casing.or housing 10 containing the cleaner mechanism and which may be disposed either in the windshield header construction or in the lower vehicle body portion, as beneath the cowl.

Within the head casing the driven shaft has telescopic parts 11 and 12 splined together by key 13, the shaft part 12 being journaled in fixed bearings 14 and carrying a worm 15 in mesh with worm gear 16 on the transverse wiper actuating shaft 17. The telescopic shaft part 11 is connected to the flexible shaft part 8 and is given slidable support on the stationary shaft part 12. If the shaft part 11 is shifted axially, the flexible part 8 and its connector part 5 will likewise move and thus make or break the connection with the drive shaft, according to direction of shifting movement; when the shaft part 11 is extended the connector parts will engage, and vice versa.

Resilient means are provided for separating the connector parts, and such means are timed to function at a particular interval in the cycle of wiper operation so as to enable uniformity of parking position. The illustrated embodiment of such parking means includes a rack 18, which is rotatably connected to the shiftable shaft part 11 and is slidably guided in the casing, a pinion 19 in mesh with the rack, a setting arm 20 fixed to the pinion, and a spring 21 which is anchored at one end by a bracket 22 and connected at its opposite end to the arm for movement thereby across a dead center position or across the pivotal axis of the arm. The setting arm is disposable in the path of a trip arm 23 which is fixed on the wiper actuating shaft 17 to rotate therewith, the two arms being provided with coacting shoulders 24. The arm 23 serves as a crank arm and is connected by oppositely extending links 25 to wipers 26, only one wiper being here shown. As the wipers approximate the end of their strokes, the trip arm shoulder 24 will contact the shoulder of arm 20 and lift it to shift the spring 21 across the pivot axis whereupon the spring will pull the setting arm and rotate the pinion, resulting in movement of the rack and a retraction of the connector part 5 from its companion drive part. As illustrated in Fig. 1, when the cleaner is in operation the setting arm is normally supported by a stop pin 27 with the spring slightly below a dead center position so that a very small movement of the setting arm is required to set the parking means in operation. This slight movement is permitted by the slot 3' without interrupting the drive until the spring begins to function.

To start the cleaner in operation, the pinion 19 and its connected setting arm are shifted inwardly to remove the latter from the path of the trip arm. Simultaneously, the flexible shaft is shifted to engage connector or clutch part 5 with its companion part 3. These manipulations are coordinated and placed under a common control including a shaft 28 which is provided with a handle or other actuating part (not shown). This control shaft has a play connection with the pinion shaft 29 in the form of a radial pin 30 and a circumferential slot 31. The control shaft also has a detent 32 normally engaged in a seat 33 to hold the setting arm out of the path of the trip arm. The seat 33 is formed in a boss 34 of the casing, and from this seat the boss has a dwell face 35 leading to a descent 36 terminating in a lower seat 37. A spring 38 urges the setting arm toward the path of the trip arm and also yieldably holds the detent in its seats. When the control is turned clockwise, the detent initially rides up the face 36 to withdraw the setting arm from the plane of the path of the trip arm, the pin and slot play connection 30, 31 permitting such movement independently of any pinion rotation. As soon as the play in this connection has been absorbed, the continued clockwise rotation of the control shaft will impart like rotation of the pinion to shift the rack, the flexible shaft, and the movable connector part to effect a reclutching of the cleaner to its drive. When the clutch parts are reengaged, the control will be held operative by reason of the detent engaging in the seat 33. This rotation of the pinion also brings the setting arm over against the stop pin 27 where it is held by the spring 21 which has been moved across dead center.

Whenever it is desired to stop the cleaner, the control is rotated counterclockwise whereupon, by reason of the play connection 30, 31, the detent moves down the descent so as to permit of the spring 38 shifting the setting arm into the path of the trip arm. Therefore, when the trip arm comes against the setting arm shoulder 24, the setting arm will be swung upwardly to lift the spring 21 above the pivotal axis whereby the resilient urge will rotate the setting arm counterclockwise and, through the rack and pinion, withdraw the clutch or connector part 5 from its drive. Thus the wiper or wipers will be arrested in the same position each time, which position will be predetermined and preferably at the end of a wiper stroke.

Means are also provided to dispose the parked wiper without the field or that area of the windshield normally traversed during operation. This may be effected by shifting the head casing and to this end said casing is slidably or movable supported on its mounting bracket 39 in a suitable manner, as by bolt and slot means 42. A cam 40, preferably fixed on the control shaft 28 for centralizing the control, operates between and against spaced shoulders 41 on the mounting bracket 39, so that as the cleaner is shut off the head casing 10 will be moved laterally on its bracket to shift the axis of the wiper actuating shaft 17. This results in moving the connecting links lengthwise and a slight additional arcuate movement of the wiper 26 beyond one end of its normal path. When the cleaner is again set in motion the head casing will be shifted back to its normal operative position by and during operation of the control shaft.

What is claimed is:

1. Mechanism of the character described comprising an actuating shaft, a trip member operable with the shaft in an arcuate path, means for operating the shaft, means for disconnecting the shaft from its operating means to arrest the shaft, said arresting means including a pivoted arm operatively connected to effect such disconnection upon movement of the pivoted arm by the trip member, said arm being normally disposed out of the path of said trip member and adapted to be moved bodily into such path for movement by said trip member, and a spring anchored at one end and acting on the arm to urge it to a position for releasing the shaft from its operating means when said arm is moved by said trip member.

2. Mechanism of the character described, comprising an actuating shaft, a drive for the shaft, a transmission connecting the drive to the shaft and including separable connector parts, means operatively connected to one connector part for moving it out of operative relationship with the companion connector part to arrest the shaft, a spring actuated setting member mounted for spring actuated movement in a definite path and manually movable against the urge of its spring to a pre-set position without such definite path, means operatively connecting the setting member to said first means whereby upon release said setting member will upon its spring actuated movement serve to separate said connector parts, said second means supporting the setting member for bodily movement from the pre-set position into such definite path, and tripping means operable by the mechanism and engageable with the setting member upon bodily movement thereof into such definite path for initiating the spring actuated movement thereof.

3. Mechanism of the character described, comprising an actuating shaft, a drive therefor, a transmission connecting the drive to the shaft and including separable connector parts by which the shaft may be brought to rest, means operatively connected to one connector part for moving it out of operative relationship with the companion connector part to arrest the shaft, a spring actuated setting member connected to said means and mounted for spring actuated movement to operate said means for separating said connector parts, a trip member movable in a definite path by said mechanism to initiate the spring actuated movement of the setting member, and means manually operable to move the setting member against the urge of its spring to a pre-set position outside the path of said trip member, said manually operable means being operable to bodily shift the setting member from such pre-set position into the path of said trip member to release said setting member for its spring actuated movement.

4. Mechanism of the character described, comprising an actuating shaft, a drive therefor, a transmission connecting the drive to the shaft and including separable connector parts by which the shaft may be brought to rest, means operatively connected to one connector part for moving it out of operative relationship with the companion connector part to arrest the shaft, a spring actuated setting member connected to said means and mounted for spring actuated movement to operate said means for separating said connector parts, a trip member movable in a definite path by said mechanism to initiate the spring actuated movement of the setting member, and means manually operable to pre-set the setting member in a position outside the path of said trip member and movable to dispose the setting member in the path of said trip member for release thereby from its pre-set position.

5. Mechanism of the character described, comprising an actuating shaft, a drive for the shaft, a transmission connecting the drive to the shaft and including separable connector parts, means operatively connected to one connector part for moving it out of operative relationship with the companion connector part to arrest the shaft, means supporting the shaft for bodily movement to dispose it laterally from its normal operating position, a spring actuated setting member connected to said first means and movable to a pre-set position for subsequent spring actuation therefrom, a trip member operated by the mechanism in a definite path, said setting member being movable from its pre-set position into the path of the trip member for being released from such pre-set position for such spring actuated movement whereby to separate said connector parts, and manual means for concurrently effecting bodily movement of both the setting member and the actuating shaft.

6. Mechanism of the character described comprising an actuating shaft, a drive for the shaft, a transmission connecting the drive to the shaft and including separable connector parts, means operatively connected to one connector part and operable by the transmission to disconnect said one connector part from the companion connector part, means supporting the actuating shaft for lateral movement, and manual means for shifting the shaft laterally and setting said first means in position for operation by said transmission to separate said connector parts.

7. Mechanism of the character described comprising an actuating shaft, a drive for the shaft, a transmission connecting the drive to the shaft and including separable connector parts, means operatively connected to one connector part to operatively disconnect it from the companion connector part, means supporting the actuating shaft for lateral movement, a spring actuated setting member connected to said first means for spring actuated movement, means operable by a moving part of the transmission for initiating a timed operation of said setting member, manually operable means connected to said shaft supporting means for shifting the shaft laterally, and a play connection between said manually operable means and said setting member for permitting independent movement of said manually operable means and by which the setting member may be positioned for such timed operation, subsequent to the shaft shifting operation.

ERWIN C. HORTON.